(12) United States Patent
Pichler et al.

(10) Patent No.: US 11,748,590 B2
(45) Date of Patent: Sep. 5, 2023

(54) RFID TAG WITH IMPEDANCE TUNING, AND METHOD OF IMPEDANCE TUNING OF AN RRID TAG

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 174 days.

(21) Appl. No.: 17/247,647

(22) Filed: Dec. 18, 2020

(65) Prior Publication Data
US 2022/0198236 A1    Jun. 23, 2022

(51) Int. Cl.
*G06K 19/07* (2006.01)
*G06K 19/077* (2006.01)

(52) U.S. Cl.
CPC ..... *G06K 19/0726* (2013.01); *G06K 19/0724* (2013.01); *G06K 19/07756* (2013.01); *G06K 19/07786* (2013.01)

(58) Field of Classification Search
CPC ............. G06K 7/0008; G06K 7/10148; G06K 19/0713; G06K 19/0716; G06K 19/0723; G06K 19/0724; G06K 19/0726; G06K 19/07749; G06K 19/07756; G06K 19/07786; H01Q 1/2225; H01Q 9/0442; H02J 50/12; H02M 3/07
USPC ....................................................... 34/572.7
See application file for complete search history.

(56) References Cited

U.S. PATENT DOCUMENTS

| | | | |
|---|---|---|---|
| 6,362,738 B1* | 3/2002 | Vega | G06K 7/10326 340/568.1 |
| 7,339,481 B2 | 3/2008 | Duron | |
| 7,579,906 B2 | 8/2009 | Kumar et al. | |
| 7,907,899 B1 | 3/2011 | Oliver | |
| 7,944,279 B1 | 5/2011 | El Waffaoui | |
| 8,186,601 B2 | 5/2012 | Russell et al. | |
| 8,258,958 B2 | 9/2012 | Kang et al. | |

(Continued)

FOREIGN PATENT DOCUMENTS

| | | |
|---|---|---|
| CN | 104517133 A | 4/2015 |
| CN | 110766122 A | 2/2020 |

(Continued)

OTHER PUBLICATIONS

Missoni, et al. "A Triple-Band Passive RFID Tag", IEEE International Solid-State Circuits Conference—Digest of Technical Papers, 3 pgs., retreived from the internet at: https://ieeexplore.ieee.org/document/4523170, (Feb. 2008).

(Continued)

*Primary Examiner* — Stephen R Burgdorf

(57) ABSTRACT

A Radio Frequency Identification (RFID) tag is disclosed. The RFID tag includes an antenna to receive a high frequency signal, a capacitor bank coupled with the antenna, a charge pump coupled with the antenna configured to convert the high frequency signal to a direct current (DC) signal, an envelope detector to measure peak voltage of the high frequency signal and a detector to compare an output of the charge pump and an output of the envelope detector. The RFID tag also includes an impedance tuning circuit coupled with the charge pump and the envelope detector configured change a capacitance of the capacitor bank based on an output of the detector and the envelope detector.

19 Claims, 3 Drawing Sheets

(56) References Cited

U.S. PATENT DOCUMENTS

| | | |
|---|---|---|
| 8,729,960 B2 | 5/2014 | Ochoa et al. |
| 8,952,792 B1 | 2/2015 | Srinvas et al. |
| 9,048,819 B2 | 6/2015 | Rokhsaz et al. |
| 9,087,281 B2 | 7/2015 | Maguire et al. |
| 9,360,504 B2 | 6/2016 | Pillin et al. |
| 9,362,895 B2 | 6/2016 | Seth et al. |
| 9,514,402 B1 | 12/2016 | Kim et al. |
| 10,679,115 B2 | 6/2020 | Huhtasalo |
| 2003/0085278 A1* | 5/2003 | Schoenbauer ..... G06K 19/0723 235/451 |
| 2005/0104553 A1 | 5/2005 | Mickle et al. |
| 2007/0153940 A1* | 7/2007 | Oishi .................. H04L 27/06 375/333 |
| 2010/0019907 A1* | 1/2010 | Shanks ............... G06K 7/0008 340/572.5 |
| 2011/0148221 A1* | 6/2011 | Trotter ................... H02J 50/20 307/104 |
| 2011/0241750 A1* | 10/2011 | Hill ....................... H03J 1/0008 327/306 |
| 2012/0049937 A1* | 3/2012 | El Waffaoui .......... H02M 7/217 327/536 |
| 2013/0321130 A1* | 12/2013 | Waffaoui ........... G06K 19/0726 235/492 |
| 2014/0203989 A1 | 7/2014 | Jeong et al. |
| 2016/0328584 A1* | 11/2016 | Rokhsaz ............ G06K 7/10326 |
| 2017/0093167 A1 | 3/2017 | Von Novak, III et al. |
| 2017/0281944 A1* | 10/2017 | Khalil .................. A61N 1/3787 |
| 2020/0195256 A1* | 6/2020 | Emira ................ H04L 27/0014 |
| 2021/0248331 A1* | 8/2021 | Storms ............... G06K 19/0707 |

FOREIGN PATENT DOCUMENTS

| | | |
|---|---|---|
| EP | 2669851 A2 | 12/2013 |
| KR | 101939239 B1 | 4/2019 |

OTHER PUBLICATIONS

Non-Final Rejection for U.S. Appl. No. 17/247,650, 10 pgs. (dated Sep. 29, 2021).

U.S. Appl. No. 17/247,650 filed Dec. 18, 2020, entitled: Dual System RFID Tag. The Examiner is referred to the copending patent prosecution of the common Applicant (no attachment).

Non-Final Rejection for U.S. Appl. No. 17/247,650, 10 pgs. (dated Mar. 23, 2022).

Notice of Allowance for U.S. Appl. No. 17/247,650, 6 pgs. (dated Sep. 15, 2022).

* cited by examiner

RFID TAG WITH IMPEDANCE TUNING, AND METHOD OF IMPEDANCE TUNING OF AN RRID TAG

BACKGROUND

Radio Frequency Identification (RFID) refers to a wireless system comprised of two components: tags and readers. The reader is a device that has one or more antennas that emit radio waves and receive signals back from the RFID tag. Tags, which use radio waves to communicate their identity and other information to nearby readers, can be passive or active. Passive RFID tags are powered by the reader and do not have a battery. Active RFID tags are powered by batteries. Near Field Communication (NFC) is a wireless communication technology that acts over short distances for two-way communication. The use of NFC tags is growing in several markets, including the medical, consumer, retail, industrial, automotive, and smart grid markets. NFC is a type of RFID technology. Due to internal or external factors such as distance from the other device or tag, nearby objects, etc. the tag needs to be tuned to balance the impedance to optimize the received signal strength before a data read cycle starts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a Radio Frequency Identification (RFID) tag is disclosed. The RFID tag includes an antenna to receive an input AC signal, a processing system coupled with the antenna to optimize signal strength of the input AC signal, a charge pump coupled with the antenna and configured to convert the AC signal to a direct current (DC) signal and an envelope detector to measure peak voltage of the input AC signal. A detector is also included to compare the output of the charge pump and the output of the envelope detector and configured to send a signal to the processing system to indicate a change in the signal strength. A limiter circuit may also be included to cap the output of the charge pump to a preselected voltage to protect the internal components of the RFID tag from events such as electrostatic discharge (ESD). The indication of a change provided to the processing system includes indicating if the signal strength is increasing or decreasing. The processing system is further configured to change an input impedance of the antenna. In some examples, the limiter circuit includes a current measuring circuit configured to measure a current being sunk by the limiter circuit and the detector is configured to measuring if the signal strength is increasing or decreasing based on the measure. In such embodiments, the envelop detector may be an optional component.

In another embodiment, a Radio Frequency Identification (RFID) reader is disclosed. The RFID tag includes an antenna to receive a high frequency signal, a capacitor bank coupled with the antenna, a charge pump coupled with the antenna configured to convert the high frequency signal to a direct current (DC) signal, an envelope detector to measure peak voltage of the high frequency signal and a detector to compare an output of the charge pump and an output of the envelope detector. The RFID tag also includes an impedance tuning circuit coupled with the charge pump and the envelope detector configured change a capacitance of the capacitor bank based on an output of the detector and the envelop detector.

In some examples, the RFID tag also includes a limiter circuit configured to cap the output of the charge pump to a preselected voltage. A processing system is included. The detector is configured to send a signal or respond to the processing system to indicate that an improvement in signal strength has been detected. This information may be used by a tuning algorithm to ensure an optimal signal strength. The capacitor bank includes switchable capacitors configured to be connected or disconnected form the capacitor bank based on a control signal from the impedance tuning circuit. The limiter circuit includes a current measuring circuit configured to measure current being sunk by the limiter circuit. The detector includes a comparator to compare the voltage output of the charge pump and the voltage output of the envelope detector using current to voltage converters. The current being sunk by the limiter is proportional to the rise in the signal strength.

In yet another embodiment, another Radio Frequency Identification (RFID) tag is disclosed. The RFID tag includes an antenna to receive a high frequency signal, a capacitor bank coupled with the antenna, a charge pump coupled with the antenna configured to convert the high frequency signal to a direct current (DC) signal and a limiter circuit to cap an output of the charge pump to a predefined voltage level. The limiter includes a current measuring circuit. The RFID tag also includes a detector to compare an output of the charge pump and an output of the current measuring circuit and an impedance tuning circuit coupled with the charge pump and the limiter circuit configured change a capacitance of the capacitor bank based on an output of the detector. In some examples, the limiter circuit includes two diode and a capacitor and is configured to output a voltage that is capped to the predefined voltage level.

The RFID tag may include a processing system. The detector is configured to send a signal or respond to the processing system to indicate the end of a tuning cycle in which the capacitance of the capacitor bank is set to a value to achieve an optimal signal strength. The capacitor bank includes switchable capacitors configured to be connected or disconnected form the capacitor bank based on a control signal from the impedance tuning circuit. The current measuring circuit configured to measure current being sunk by the limiter circuit. The detector includes a comparator to compare the voltage output of the charge pump and the voltage output of the current measuring circuit using current to voltage converters.

In yet another embodiment, a method of tuning a Radio Frequency Identification (RFID) tag is disclosed. The method includes converting an AC input signal received from an antenna to a DC signal, measuring peak voltage of the AC input signal using an envelope detector, comparing the DC signal with the peak voltage and tuning a capacitor bank to tune the antenna using a capacitor tuner based on the DC signal, the peak voltage and the comparing. The method may include sending a notification to a processing system after the tuning to indicate that the tuning cycle has completed. The tuning includes changing a capacitance value of a capacitor bank coupled with the antenna and the tuning is performed during a tuning phase of the RFID tag prior to a data reading cycle. In some examples, the changing a capacitance value of the capacitor bank is repeated until an optimum signal strength is achieved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
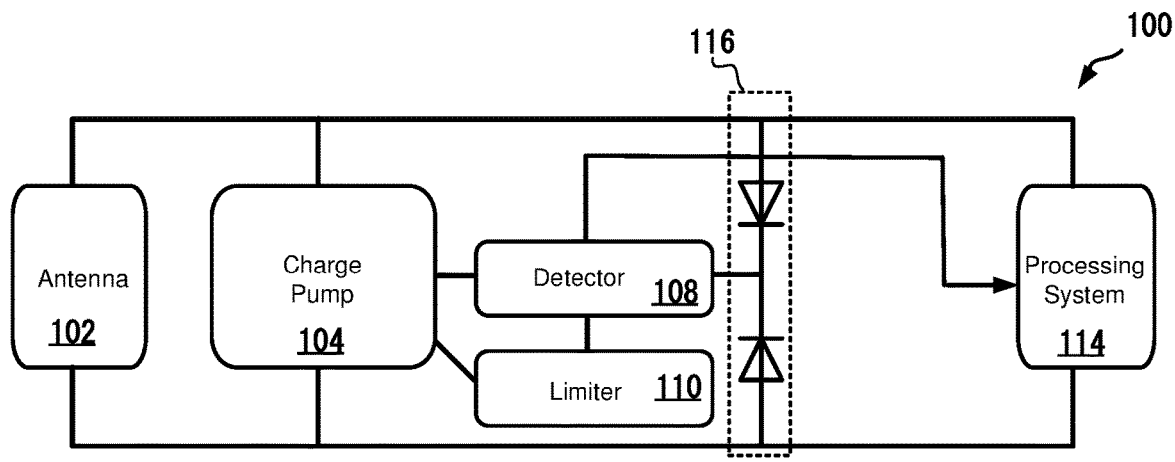
FIGS. 1 and 2 depict respective RFID tags in accordance with one or more embodiments of the present disclosure.

Note that figures are not drawn to scale. Not all components of the RFID tag are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

RFID tags can store a range of information from one serial number to several pages of data. RFID tags can be mobile so that they can be carried by hand, or they can be mounted on a post or overhead. RFID systems can also be built into the architecture of a cabinet, room, or building. NFC is a technology based on RFID technology. NFC technology can be used to provide peer-to-peer communication or one way communication. When two NFC enabled devices are very close to each other, about 4 cm or less, they can communicate with each other using the radio waves. Of the two devices communicating using NFC, at least of them has to be an active device (powered). In many cases, this would be a smartphone, tablet, security pad, or a payment terminal. The other device can be either active or passive (unpowered). Using NFC, two devices can be set up in less than one-tenth of a second.

In an active peer-to-peer (P2P) mode, two active devices create a wireless communication channel between them. The active device, with an external power supply, can power the passive device with the electromagnetic field coming from the active device. NFC passive devices are used in many applications because the passive NFC device can be a simple tag. NFC devices communicate with each other via radio waves. The active NFC device has to be enabled (turned on) first. The radio waves for NFC are generated using an antenna. NFC works by exploiting the properties of electromagnetic fields, using the inductive coupling between NFC devices. It operates at the 13.56 MHz frequency, which is a license-free section of HF on the RF spectrum.

The strength of the received signal may be dependent on the distance as well as external factors such as nearby objects, human touch, etc. Therefore, in some examples, RFID tags may include a switchable capacitor bank that includes a plurality of capacitors coupled with switches. The value of the capacitor may be changed by turning one or more of these switches on or off. The input impedance of the receiver antenna may be changed by changing the capacitor value to optimize the signal strength of the input signal.

Figure 5:
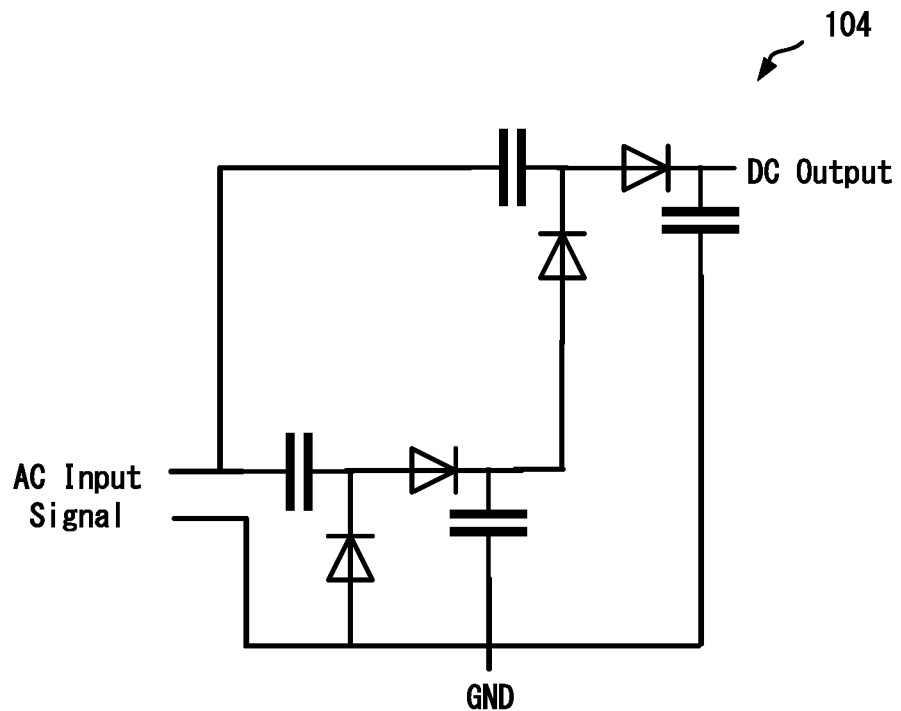
FIG. 5 shows a simplified charge pump circuit suitable for low power applications such as RFID in accordance with one or more embodiments.

FIG. 1 shows a schematic of an embodiment of an RFID tag 100 that includes an antenna 102. The antenna 102 may be a wire coil type antenna. The antenna 102 provides the input AC signal to a charge pump (e.g., AC to DC converter) 104. The input signal is a continuous wave with a predefined frequency (e.g., 13.56 MHz). The charge pump 104 converts the input AC signal to a DC voltage. In some embodiments, the charge pump 104 may also amplify the signal using a bias voltage. The charge pump 104 may use diodes and charging/discharging capacitors to change the input AC signal to higher voltage DC signal. In some examples, transistors may be used in place of diodes. FIG. 5 shows a sample charge pump circuit 104 using a rectifier circuit. While the input AC signal is positive, current flows through diodes and charges capacitors and during the negative cycle, no current flows through diodes and capacitors discharge. The use of multiple rectifier stages is optional and can be used or not used depending upon a desired minimum voltage output as multiple stages may boost the output voltage but at the cost of efficiency. The frequency range is limited by the capacitor size and diode switching speed, therefore, the circuit may be tuned for an operational frequency of 13.56 MHz by using the capacitors and diodes of appropriate value and electrical characteristics.

The charge pump 104 may include or may be coupled with a limiter circuit 110. The limiter circuit 110 caps the output of the charge pump 104 to a predefine voltage. In one example, the limiter circuit 110 may be similar to the limiter circuit shown in FIG. 4. In another embodiment, the current sensor 122 (FIG. 4) may be excluded. The limiter circuit 110 protects the components due to electrostatic events or too high received signal strength. An envelope detector 116 is included to provide an a DC output from the envelope of the input signal received at the antenna 102. An envelope detector (or peak detector) is an electronic circuit that takes a (relatively) high-frequency amplitude modulated signal as input and provides an output which is the envelope of the original signal. The detector 108 is configured such that when the signal strength of the input signal has not been limited by the limiter circuit 110, the detector 108 uses the output of the charge pump 104 and when the output of the charge pump 104 is limited by the limiter circuit 110, the output of the envelop detector 116 is used to detect the changes in the input signal strength.

A processing system 114 is included and configured to optimize the input signal strength based on a signal from the detector 108. The signal from the detector 108 may include information about the changes in the signal strength of the input AC signals received via the antenna 102 to enable the processing system 114 to optimize the input signal strength, in one example, through changing the input impedance of the RFID tag 100. The processing system 114 may also be configured to change internal states (e.g., tuning state, data reading state) of the RFID tag 100. In some examples, the use of the envelop detector 116 may be optional. In such embodiments, the amount of current being sunk by the limiter circuit 110 may be used to measure the signal strength. The more current being sunk corresponds the a higher input AC signal strength when the input signal strength is above the limit threshold of the limiter circuit 100.

Figure 2:
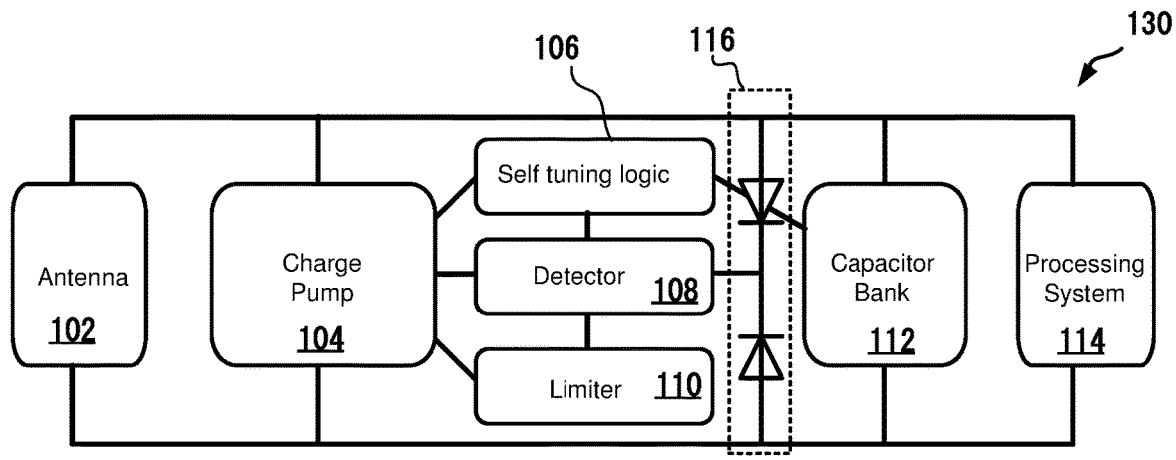

FIG. 2 shows a schematic of another embodiment of an RFID tag 130 that includes an antenna 102. The antenna 102 may be a wire coil type antenna. The antenna 102 provides the input AC signal to a charge pump (e.g., AC to DC converter) 104. The input signal is a continuous wave with a predefined frequency (e.g., 13.56 MHz). The charge pump 104 converts the input AC signal to a DC voltage. In some embodiments, the charge pump 104 may also amplify the signal using a bias voltage. The charge pump 104 may use diodes and charging/discharging capacitors to change AC signal to higher voltage DC signal. In some examples, transistors may be used in place of diodes. FIG. 5 shows a sample charge pump circuit 104 with two stages of rectifier circuits. While input AC signal is positive, current flows through diodes and charges capacitors and during the negative cycle, no current flows through diodes and capacitors discharge. The use of multiple rectifier stages is optional and can be used or not used depending upon a desired minimum voltage output as multiple stages may boost the output voltage but at the cost of efficiency. The frequency range is limited by the capacitor size and diode switching speed, therefore, the circuit may be tuned for an operational frequency of 13.56 MHz by using the capacitors and diodes of appropriate value and electrical characteristics.

The charge pump 104 may include or may be coupled with a limiter circuit 110. The limiter circuit 110 caps the output of the charge pump 104 to a predefine voltage. In one example, the limiter circuit 104 may be similar to the limiter circuit shown in FIG. 4. In another embodiment, the current sensor 122 (FIG. 4) may be excluded. The limiter circuit 110 protects the components due to electrostatic events or too high received signal strength. A processing system 114 is included to process the received data based on a desired user application. For example, if the RFID tag 130 is embodied in a phone, the processing system 114 of the RFID tag 130 may transmit the data to the phone processor for further processing of the received data.

An envelope detector 116 is included to provide an a DC output from the envelope of the input signal received at the antenna 102. An envelope detector (or peak detector) is an electronic circuit that takes a (relatively) high-frequency amplitude modulated signal as input and provides an output which is the envelope of the original signal. A self-tuning logic block 106 is included to sense if the received signal strength is increasing or decreasing. To optimize the input signal strength, the self-tuning logic block 106 sends control signal to a switchable capacitor bank 112 to change the capacitance of the capacitor bank 112. The self-tuning logic block 106 may continuous change the capacitance of the capacitor bank 112 to settle to a desired signal strength. The tuning may occur for a brief period of time before the data transmission cycle begins.

The detector 108 is configured to compare the output of the charge pump 104 and the output of the envelop detector 116 and provide a signal to the self-tuning logic block 106 to enable the self-tuning logic block 106 to optimize the received signal strength by tuning the input impedance of the capacitor bank 112 even when the limiter 110 is limiting the output of the charge pump 104. The detector 108 is configured such that when the signal strength of the input signal has not been limited by the limiter 110, the detector 108 uses the output of the charge pump 104 and when the output of the charge pump 104 is limited, the output of the envelop detector 116 is used for tuning the capacitance of the capacitor bank 112.

A processing system 114 is included to process the received data based on a desired user application. For example, if the RFID tag 130 is embodied in a phone, the processing system 114 of the RFID tag 130 may transmit the data to the phone processor for further processing of the received data. The capacitor bank 112 may not be optimally tuned if the signal is limited by the limiter circuit 110 to a predefined maximum value. An envelope detector 116 is included to provide an a DC output from the envelope of the input signal received at the antenna 102. An envelope detector (or peak detector) is an electronic circuit that takes a (relatively) high-frequency amplitude modulated signal as input and provides an output which is the envelope of the original signal. A detector 108 is included to compare the output of the charge pump 104 and the output of the envelop detector 116 and provide a signal to the self-tuning logic block 106 so that the tuning is optimized even when the limiter 110 is limiting the output of the charge pump 104. The detector 108 is configured such that when the signal strength of the input signal has not been limited by the limiter 110, the detector 108 uses the output of the charge pump 104 and when the output of the charge pump 104 is limited, the output of the envelop detector 116 is used for tuning the capacitance of the capacitor bank 112. Once the capacitance is optimally tuned during the tuning cycle, the processing system 114 starts to read the data received via the input signal. The envelop detector 116 may include a diode based circuit to convert the input signal AC voltage to a DC voltage.

Figure 3:
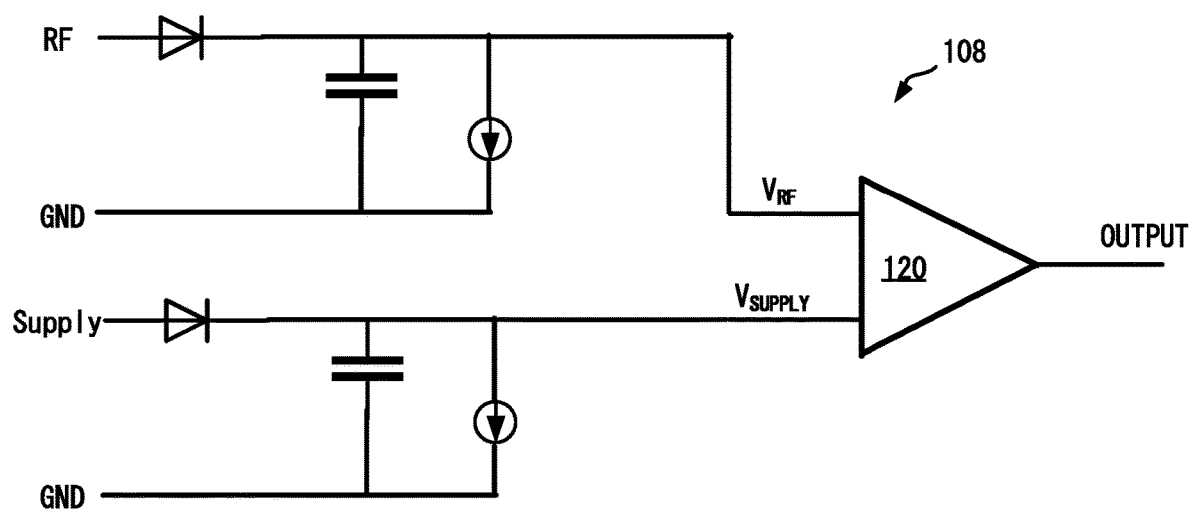
FIG. 3 depicts a detector circuit used in the RFID tag in accordance with one or more embodiments of the present disclosure.

FIG. 3 shows a sample comparator circuit included in the detector 108. The comparator circuit includes the RF input, which is the output of the envelop detector 116. Supply input is coupled with the output of the charge pump 104. A current to voltage converter may be included to output the RF voltage $V_{RF}$ based on the current flowing between the RF input and ground GND. $V_{RF}$ is inputted to a comparator 120. A same or similar circuit including a diode, a capacitor and a current to voltage converter is included and is coupled with the output of the charge pump 104. The output $V_{SUPPLY}$ of this parallel circuit is inputted to the comparator 120. The output of the comparator 120 may be coupled with the self-tuning logic block 106 so that the self-tuning logic block 106 can use the output of the charge pump 104 or the output of the envelop detector 116 for tuning the capacitance of the capacitor bank 112.

Figure 4:
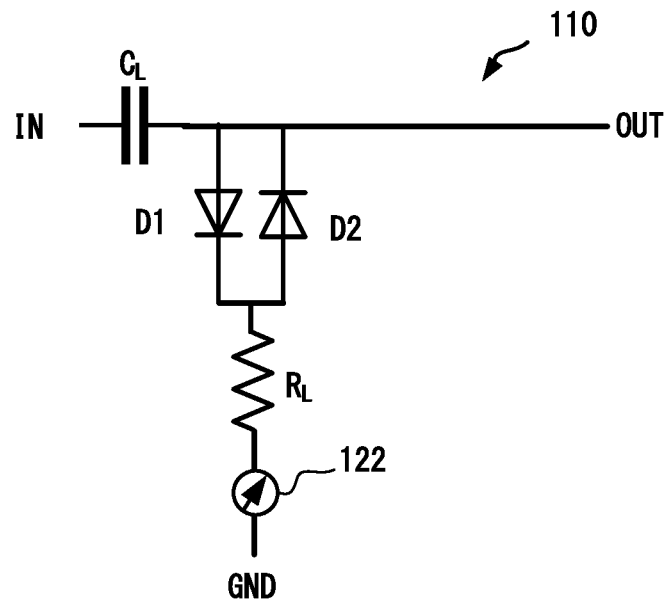
FIG. 4 shows a simplified limiter circuit used in the RFID tag in accordance with one or more embodiments.

In some examples, the RFID tag 130 may not include the envelop detector 116. In such examples, the tuning is done based on the current being sunk by the limiter circuit 110 together with the output of the charge pump 104. FIG. 4 shows a sample limiter circuit 110. The limiter circuit 110 may include a capacitor $C_L$ coupled with the input port and two diodes D1, D2 coupled with the capacitor $C_L$. The diodes D1, D1 may be coupled with a resistor $R_L$ and the resistor RL is coupled with a current sensor 122. In some examples, the detector 108 monitors the current being sunk by the limiter circuit 110 and uses a current to voltage converter to provide $V_{RF}$ input to the comparator 120 (FIG. 3). If the input signal strength is not limited by the limiter circuit 110, the comparator 120 may output a zero and when the signal is being limited, the current being sunk by the limited circuit 110 will rise in proportion of the input signal strength. The self-tuning logic block 106 will tune the capacitance of the capacitor bank 112 based on the current measurement when the signal strength is over a limit threshold of the limiter circuit 110. The self-tuning logic block 106 is configured to adjust the capacitance of the capacitor bank 112 to optimize the signal strength via the impedance tuning. In some examples, when the tuning process is complete, a signal may be flagged so that the processing system 114 may enter into the data read cycle to read the data received via the input signal at the antenna 102.

The embodiments described herein overcomes the boundary condition limitations by using a dual-input field detector for enhancing the detection range by combining different signals that widens the overall detection range. The embodiments described herein ensures a monotonic behavior of the return link over field strength without having any read hole in the application.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A Radio Frequency Identification (RFID) tag, comprising:
    an antenna configured to receive radio waves during a tuning cycle of the RFID tag and, in response, to provide an input AC signal;
    an input impedance circuit coupled across the antenna, wherein the input impedance circuit has a input impedance that is changeable;
    a processing system coupled with the antenna to optimize, based on a detector signal, a signal strength of the input AC signal received from the antenna by changing an input impedance of the antenna;
    a charge pump coupled across the antenna and configured to receive the input AC signal, to convert the input AC signal to a first direct current (DC) signal, and to provide a first output signal based on the first DC signal;

an envelope detector coupled across the antenna and configured to receive the input AC signal, and to provide a second output signal based on an envelope of the input AC signal; and a detector with a first input coupled to the charge pump and with a second input coupled to the envelope detector, wherein the detector is configured to receive the first output signal of the charge pump and the second output signal of the envelope detector, and during the tuning cycle, to produce the detector signal based on a comparison of the first output signal and the second output signal, wherein the detector signal includes an indication of a change in a signal strength of the input AC signal received from produced by the antenna.

2. The RFID tag of claim 1, further including a limiter circuit configured to cap the first output signal of the charge pump to a predefined voltage.

3. The RFID tag of claim 2, wherein the limiter circuit includes a current measuring circuit configured to take a measurement of a current being sunk by the limiter circuit, and the detector is configured to measure if the signal strength is increasing or decreasing based on the measurement of the current being sunk by the limiter circuit.

4. The RFID tag of claim 1, wherein the indication of the change includes indicating if the signal strength is increasing or decreasing.

5. The RFID tag of claim 1, wherein, during the tuning cycle, the input AC signal is a continuous wave with a predefined frequency.

6. A Radio Frequency Identification (RFID) tag, comprising:

an antenna configured to receive a high frequency signal, and in response, to provide an input AC signal;

a charge pump coupled across the antenna and configured to receive the input AC signal, to convert the input AC signal to a first direct current (DC) signal, and to provide a first output signal based on the first DC signal;

an envelope detector coupled across the antenna and configured to receive the input AC signal, and to provide a second output signal based on an envelope of the input AC signal;

a detector with a first input coupled to the charge pump and with a second input coupled to the envelope detector, wherein the detector is configured to receive the first output signal of the charge pump and the second output signal of the envelope detector, and to produce a detector signal based on the first output signal and the second output signal; and an impedance tuning circuit coupled with the detector and configured to receive the detector signal, and based on the detector signal, to change an input impedance of the RFID tag during a tuning cycle.

7. The RFID tag of claim 6, further including a limiter circuit configured to cap the first output signal of the charge pump to a predefined voltage.

8. The RFID tag of claim 7, wherein the limiter circuit includes a current measuring circuit configured to measure current being sunk by the limiter circuit.

9. The RFID tag of claim 7, wherein:

when the limiter circuit is not capping the first output signal of the charge pump, the detector provides the first output signal of the charge pump as the detector signal; and when the limiter circuit is capping the first output signal of the charge pump, the detector provides the second output signal of the envelope detector as the detector signal.

10. The RFID tag of claim 6, wherein the detector includes a comparator configured to make a comparison of the first output signal of the charge pump and the second output signal of the envelope detector, and wherein the detector signal is based on the comparison of the first output signal and the second output signal.

11. The RFID tag of claim 6, further comprising:

an input impedance circuit coupled across the antenna, wherein the input impedance circuit is controllable to change the input impedance of the RFID tag.

12. The RFID tag of claim 11, wherein the input impedance circuit comprises a capacitor bank.

13. The RFID tag of claim 6, wherein the detector signal is based on a comparison of the first and second output signals.

14. The RFID tag of claim 13, wherein an end of the tuning cycle comprises a capacitance of the capacitor bank set to a value to achieve an optimal signal strength.

15. The RFID tag of claim 13, wherein the capacitor bank includes switchable capacitors configured to be connected or disconnected from the capacitor bank based on a control signal from the impedance tuning circuit.

16. A method of operating a Radio Frequency Identification (RFID) tag, the method comprising:

performing a tuning process that includes
converting, by an AC to DC converter, an AC input signal received from an antenna to a first DC signal,
measuring peak voltage of the AC input signal received from the antenna using an envelope detector,
performing a comparison of the first DC signal and the peak voltage of the AC input signal received from the antenna and
based on the comparison, changing an input impedance circuit to tune an input impedance of the RFID tag; and after the tuning process has completed, entering a data read cycle.

17. The method of claim 16, wherein the input impedance circuit comprises a capacitor bank, and changing the input impedance circuit includes changing a capacitance value of the capacitor bank.

18. The method of claim 17, wherein the changing a capacitance value of the capacitor bank is repeated until an optimum signal strength is achieved.

19. The method of claim 16, further comprising:

capping, by a limiter circuit, the first DC signal of AC to DC converter to a predefined voltage;

wherein, when the limiter circuit is not capping the first DC signal of the AC to DC converter, the detector provides the first DC signal from the AC to DC converter as the detector signal; and wherein, when the limiter circuit is capping the first output signal of the AC to DC converter, the detector provides the peak voltage from the envelope detector as the detector signal.

* * * * *